United States Patent Office 3,478,261
Patented Nov. 11, 1969

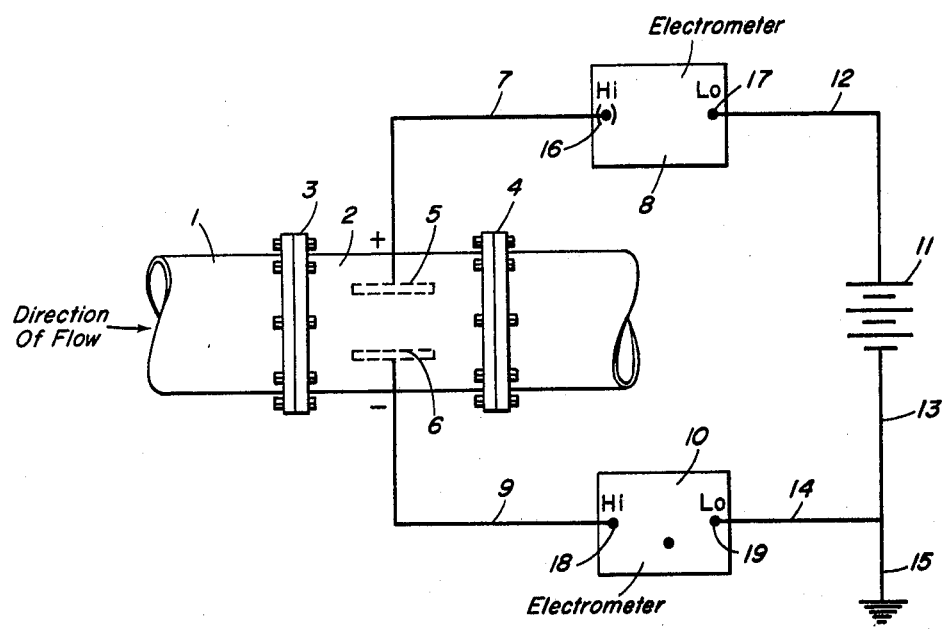

3,478,261
PROCESS FOR MEASURING STATIC CHARGE IN A LIQUID HYDROCARBON STREAM
Eric O. Forster, Scotch Plains, and Edward Effron, Springfield, N.J., assignors to Esso Research and Engineering Company, a corporation of Delaware
Continuation-in-part of application Ser. No. 480,269, Aug. 17, 1965. This application Dec. 31, 1968, Ser. No. 788,173
Int. Cl. G01r 5/28
U.S. Cl. 324—32          4 Claims

ABSTRACT OF THE DISCLOSURE

Static electrical charge in a pipe for flowing liquid hydrocarbons is measured by a system comprising a pair of oppositely charged electrodes in the pipe, a bias voltage source, a ground connected to the negative side of the bias voltage and a pair of electrometers between the electrodes and the ground. The algebraic sum of the currents flowing from the two electrodes to the ground, as shown by the two electrometers, indicates the amount of static charge.

RELATED APPLICATION

This application is a continuation-in-part of our copending Ser. No. 480,269, filed Aug. 17, 1965, now abandoned.

BACKGROUND OF THE INVENTION

This invention relates to a process for measuring quantitatively the electrical charging tendencies of hydrocarbon streams.

When hydrocarbons or mixtures of hydrocarbons such as fuels flow in a pipe, it is known that due to the continuous process of contact and separation of the fuel with the pipe wall a gradual buildup of electrical charge on the fuel occurs. Ordinarily, the charge relaxes by recombination of positive and negative charges or by discharge to ground. However, when charge buildup or charge density increases at a rate faster than the rate of recombination of charges and/or discharge to ground, the static charge can become large enough to spark between two surfaces. When the spark occurs, the discharge can be sufficient to cause a fire or expat if sufficient air is present.

The danger is not so serious in pipes as it is in tanks filled and emptied by pipes and hoses. When a static charge enters a tank with incoming fuel, charge separation occurs on the tank wall with one charge, say the negative charge, equal to the entering charge being repelled to the outer tank wall. The positive charges are not neutralized as fast as they build up, and the tank wall and the surface of the liquid in the tank develop a substantial charge.

The amount of charge on the liquid increases with the rate of charge flow into the tank, i.e., the rate of flow of the liquid. The amount of charge decreases with the ability of the fuel to dissipate the charge. Sparking may occur within a given system when the ratio of the rate of charge flow (current) and the ability to dissipate the charge (conductivity) goes above some critical level.

The buildup of static charges in fuels is aggravated by filters, separators, the presence of water and chemical additives in the fuel, overhead splash filling of fuel tanks, and turbulent flow of fuel. Many of these conditions are unavoidable during fuel transfer operations which must be done as quickly as possible. A specific example is the refueling or aircraft, which involves rapid movement of aviation gasoline or jet fuel from operating storage, through a filter/separator, an underground distribution system, another filter/separator, and then through the hose to the aircraft fuel tank at a relatively high exit velocity.

SUMMARY AND OBJECT OF THE INVENTION

The object of the invention is to provide a simple but accurate process and apparatus for the continuous measurement of the charge buildup in a flowing stream with particular reference to hydrocarbon streams, including fuels.

According to this invention, static charge in a conduit for flowing liquid hydrocarbons is measured as the algebraic sum of the currents flowing from two oppositely charged electrodes in the conduit to a ground. A suitable apparatus includes the aforesaid electrodes and ground, plus a DC bias voltage source, and a pair of electrometers for measuring the current flowing from each of the electrodes to the ground.

DESCRIPTION OF THE PREFERRED EMBODIMENTS

The invention will be described with reference to the drawing in which the sole figure is a schematic view of the apparatus.

Referring to the sole figure, reference numeral 1 denotes a pipe carrying a low conductivity dielectric liquid such as a hydrocarbon or a mixture of hydrocarbons such as gasoline or jet fuel. The pipe contains a short nipple 2 held in place by any suitable joining means such as the flange and bolt joints shown generally by reference numerals 3 and 4. The nipple can be metal or it can be a nonconducting material such as plastic. The nipple is insulated by any suitable insulating means.

A positive biased electrode 5 and a negative biased electrode 6 of the same size are disposed within the nipple. The electrodes can be any suitable highly conductive metal such as platinum, copper, nickel, stainless steel, gold plated copper, or iron, etc. The electrodes are spaced apart from one another according to their surface area. Generally speaking, the distance between electrodes will range from 1 to .001 times the area of one of the electrodes, preferably .1 to .01 times the area of one of the electrodes, where distance is expressed in inches and area in square inches. When the nipple 2 is metal, the electrodes are insulated from the metal surface.

Conductor 7 electrically connects the positive biased electrode with first electrometer 8. Conductor 9 connects the negative biased electrode with second electrometer 10. The circuit is completed by direct current power source 11, conductors 12, 13 and 14, and ground 15. The direct current power source is preferably a single battery or set of batteries having a rating of 10 to 400 volts. The preferred range is 45 to 200 volts. Electrometer 8 includes a high impedance input terminal 16 and a low impedance input terminal 17. Similarly, electrometer 10 includes high impedance input terminal 18 and low impedance input terminal 19. Both instruments may include output terminals (not shown), which are not used in the present invention. The electrometers also include polarity reversing switches so that both positive and negative currents can be indicated by a positive reading of the meter. Positive electrode 5 is connected to the high impedance input 16 of electrometer 8. Similarly, negative electrode 6 is connected to the high impedance input 18 of electrometer 10. The low impedance input 17 of electrometer 8 is connected to the positive terminal of the direct current power source 11, and similarly the low impedance input 19 of electrometer 10 is connected to the negative terminal of direct current power source 11. Electrometer 10 is used in the negative mode, i.e., the current indicated on the meter will flow in the opposite direction from that normally observed. The use of the negative mode is readily achieved with most electrometers by reversing the input polarity.

If desired, a single electrometer can be connected to provide alternate readings from each of the electrodes. In a preferred embodiment, the electrometer is arranged to provide a reading of the algebraic sum of the current from the two electrodes. In this case, the output of the two electrometers, instead of being amplified and displayed on individual meters, is fed into a differential amplifier and the algebraic sum after suitable amplification is displayed on an appropriate meter.

Suitable electrometers are those having a high input impedance on the order of $10^{12}$ to $10^{14}$ ohm and which provide amplification of the current signal from the electrodes. Solid state or electronic tube type electrometers providing for amplifications ranging from a thousandfold to a millionfold are used. Current can be displayed on an ammeter, an oscilloscope, recorder, tape or any other display device.

The currents from the electrodes are extremely minute, and the algebraic sum (which is the arithmetic difference) of the two currents is generally in the range of $10^{-11}$ to about $10^{-12}$ amps.

The operation of the process and apparatus is typified by the following example.

Iso-octane was passed from one vessel to another through an 0.5 inch inside diameter glass tube containing two platinum electrodes spaced approximately 0.25 inch apart. The electrodes had an area of 0.25 square inch each. Measurements were taken at flow velocities ranging from zero to three inches per second. The electrometers 8 and 10 were a pair of Kiethley Model 610A electrometers, made by Keithley Instruments, Inc., Cleveland, Ohio. This instrument is more fully described in "Keithley 1961–62 Catalog" and in "Instruction Manual, Model 610A Multi-Purpose Electrometer and Accessories," both published by Keithley Instruments, Inc.

The high impedance terminal 16 of electrometer 8 was connected to the positive electrode 5 and the high impedance terminal 18 of electrometer 10 was connected to the negative electrode 6. The low impedance terminals 17 and 19 of electrometers 8 and 10 were respectively connected to the positive and negative terminals of a storage battery. The output terminals of the electrometers were not used. Electrometer 8 was used in the positive mode and electrometer 10 in the negative mode so that both indicated positive currents. That is, the meter switch on electrometer 8 was set on (−) and the meter switch on electrometer 10 was set on (+). The different current readings on the two meters at zero flow rate indicate a slight imbalance of the "zero" current standardization, which can be overcome by adjustment of some internal reference voltages in the Keithley Model 610A meters.

The range switch, which selects volts, amperes, or ohms and provides for varying the imput resistance of the instrument in decade steps, was set on the ampere scale at $10^{-10}$, and the multiplier switch was set at .1. At these settings, full scale deflection of the meter indicates a current of $10^{-11}$ (i.e., $10 \times 10^{-12}$) ampere. When currents larger than $10^{-11}$ ampere were measured, the multiplier switch was set on 1. Currents as measured by each electrometer at various flow rates and applied to potentials are shown in Table I. All current readings in this table should be multiplied by $10^{-12}$ to give the actual current in amperes.

TABLE I.—EFFECT OF FLUID FLOW ON CHARGE BUILDUP
[Iso-Octane Circulated with Gear Pump Pt Electrodes in 0.5 in. ID Glass Tube]

|  | Flow Rate (in./sec.) | Current in amps $\times 10^{-2}$ | |
|---|---|---|---|
|  |  | Meter 8 | Meter 10 |
| Applied Potential: |  |  |  |
| 45 v | 0 | 4 | 2.2 |
|  | 1 | 4 | 2.2 |
|  | 1.5 |  |  |
|  | 2.2 | 4.25 | 1.95 |
|  | 3.0 | 4.65 | 1.55 |
| 90 v | 0 | 5.8 | 3.5 |
|  | 1 | 5.9 | 3.4 |
|  | 2 | 6.25 | 3.05 |
|  | 3 | 6.6 | 2.75 |
| 180 v | 0 | 10.1 | 6.3 |
|  | 0.5 | 10.25 | 6.25 |
|  | 1 | 10.5 | 6.1 |
|  | 2 | 11.25 | 5.75 |
|  | 3 | 11.75 | 5.3 |

The data show an increase in the amount of charge generated with increasing flow of hydrocarbon. Three different potentials were applied to the electrodes and the character of the deviations at each potential supports the contention that the apparatus of the invention reliably measures the generation of static charges.

It is noted that the reading derived from one electrode increases while the other decreases and it is believed that this is due to the fact that only one charge, positive or negative, is predominantly present in the hydrocarbon stream resulting in an alteration of the polarization of the electrodes.

What is claimed is:

1. A process for measuring static charge in a flowing stream of a liquid hydrocarbon comprising placing a pair of oppositely-charged electrodes in a pipe for said flowing hydrocarbon, providing first and second electrical circuits for separately conducting electrical currents between said electrodes and a ground, and separately measuring the electrical current in each of said circuits, the difference in currents being a measure of the static charge in said liquid hydrocarbon.

2. A process according to claim 1 in which a direct current bias voltage is provided.

3. A process according to claim 1 in which said currents are measured by electrometers having input impedances in the range of about $10^{12}$ to about $10^{14}$ ohm.

4. A process according to claim 1 in which the algebraic sum of said currents is in the range of about $10^{-11}$ to about $10^{-12}$ ampere.

References Cited

UNITED STATES PATENTS 2,820,946   1/1958   Robinson _____ 324—33
3,306,320   2/1967   Bond _____ 324—32 X RUDOLPH V. ROLINEC, Primary Examiner C. F. ROBERTS, Assistant Examiner U.S. Cl. X.R.

324—30, 33